US012305248B2

(12) United States Patent
Sugiyama et al.

(10) Patent No.: US 12,305,248 B2
(45) Date of Patent: May 20, 2025

(54) HEAT TREATMENT METHOD AND HEAT TREATMENT FURNACE (71) Applicants: TOYOTA BOSHOKU KABUSHIKI KAISHA, Kariya (JP); KANTO YAKIN KOGYO CO., LTD., Hiratsuka (JP)

(72) Inventors: Masaki Sugiyama, Kariya (JP); Shinichi Takahashi, Hiratsuka (JP); Kensuke Takahashi, Hiratsuka (JP); Kosuke Takahara, Hiratsuka (JP)

(73) Assignees: TOYOTA BOSHOKU KABUSHIKI KAISHA, Kariya (JP); KANTO YAKIN KOGYO CO., LTD., Hiratsuka (JP)

( * ) Notice: Subject to any disclaimer, the term of this patent is extended or adjusted under 35 U.S.C. 154(b) by 574 days.

(21) Appl. No.: 17/577,809

(22) Filed: Jan. 18, 2022

(65) Prior Publication Data

US 2022/0136077 A1 May 5, 2022

Related U.S. Application Data (63) Continuation of application No. PCT/JP2021/026198, filed on Jul. 12, 2021.

(30) Foreign Application Priority Data

Aug. 3, 2020 (JP) ................. 2020-131622

(51) Int. Cl.
*C21D 8/02* (2006.01)
*C21D 9/00* (2006.01)
*C21D 11/00* (2006.01)

(52) U.S. Cl.
CPC ......... *C21D 8/0247* (2013.01); *C21D 9/0006* (2013.01); *C21D 9/005* (2013.01); *C21D 9/0068* (2013.01); *C21D 11/005* (2013.01)

(58) Field of Classification Search
None
See application file for complete search history.

(56) References Cited

U.S. PATENT DOCUMENTS 6,221,501 B1 * 4/2001 Blotzer .................. C22C 38/06
428/629
2016/0258034 A1 9/2016 Kozono et al.
2019/0382867 A1 12/2019 Zaizen et al.

FOREIGN PATENT DOCUMENTS

CN 102586566 A 7/2012
CN 103060822 A 4/2013
(Continued)

OTHER PUBLICATIONS

Japanese Patent Office, "Office Action for Japanese Patent Application 2020-131622," Jan. 19, 2021.
(Continued)

*Primary Examiner* — Anthony M Liang
(74) *Attorney, Agent, or Firm* — HAUPTMAN HAM, LLP (57) ABSTRACT The present disclosure relates to a heat treatment method and a heat treatment furnace that enable characteristics on an equal level to those when bluing processing is performed to be obtained without the bluing processing being performed in stress-relief annealing of a motor core. A heat treatment method according to one aspect is a heat treatment method in stress-relief annealing of a motor core. The heat treatment method includes an annealing step of annealing the motor core by using an exothermic converted gas as a furnace atmospheric gas, and a cooling step of cooling the motor core obtained in the annealing step, by using an exothermic converted gas as a furnace atmospheric gas, in a temperature range from a temperature in the annealing step to 500° C. at a cooling rate exceeding 600° C. per hour.

4 Claims, 3 Drawing Sheets (56) References Cited

FOREIGN PATENT DOCUMENTS

| | | | |
|---|---|---|---|
| CN | 110863095 | A | 3/2020 |
| JP | S61-253322 | A | 11/1986 |
| JP | 2004-084053 | A | 3/2004 |
| JP | 2015-042015 | A | 3/2015 |
| JP | 2016-161243 | A | 9/2016 |
| JP | 2017-166721 | A | 9/2017 |
| WO | 2018/179871 | A1 | 10/2018 |

OTHER PUBLICATIONS

PCT/ISA/210, "International Search Report for International Application No. PCT/JP2021/026198," Sep. 7, 2021.

* cited by examiner

Fig. 4

HEAT TREATMENT METHOD AND HEAT TREATMENT FURNACE

CROSS-REFERENCE TO RELATED APPLICATION

This application is a continuation of International Application No. PCT/JP2021/026198, filed Jul. 12, 2021 which claims the benefit of priority of the prior Japanese Patent Application No. 2020-131622, filed Aug. 3, 2020. The contents of these applications are incorporated herein by reference in their entirety.

TECHNICAL FIELD

The present disclosure relates to a heat treatment method and a heat treatment furnace, and particularly to a heat treatment method and a heat treatment furnace in stress-relief annealing of a motor core using an electrical steel sheet.

BACKGROUND ART

Conventionally, an electrical steel sheet is used in an electric apparatus, for example, a static apparatus such as a transformer and a rotating apparatus such as a motor. For example, the iron core (core) of a motor is manufactured by punching non-oriented electrical steel sheets of a predetermined thickness into a stator shape or a rotor shape using a die, and laminating the steel sheets.

However, in punching processing, in a case of an end portion of a core material and caulking lamination, what are called strains such as a plastic strain and an elastic strain may remain centering in a caulked portion. Therefore, with an objective of removing these strains, stress-relief annealing has conventionally been performed which slowly cools a motor core after heating the motor core to a temperature of approximately 700° C. to 800° C. in a non-oxidizing atmospheric gas such as carbon monoxide generated by incomplete combustion of a nitrogen gas, an argon gas, a butane gas, or the like. This slow cooling is performed to avoid causing a strain in the motor core during the cooling for an improvement in iron loss and to prevent a degradation in dimensional accuracy of the motor core. A slow cooling chamber for the slow cooling is, for example, provided with all or some of a stirring fan, an air-cooled tube, a heater, and the like. A cooling rate of approximately 25° C./hour is recommended for this slow cooling.

In addition, the PATENT DOCUMENT 1, for example, discloses a motor core manufacturing method that simultaneously extracts a rotor core material and a stator core material from one non-oriented electrical steel sheet having a predetermined component composition and having a yield stress of 400 MPa or more, thereafter laminates the rotor core material to form a rotor core, laminates the stator core material, and subjects the stator core material to stress-relief annealing to form a stator core. The stator core of the motor core is subjected to stress-relief annealing after the steel sheet after finish annealing is processed into a core shape by punching processing or the like, is laminated, and is clamped by welding, caulking, or the like. According to the description of the PATENT DOCUMENT 1, a cooling rate from a soaking temperature during the stress-relief annealing of a sample extracted from the steel sheet after the finish annealing to 650° C. is preferably 10° C./minute or less, more preferably 5° C./minute or less in order to reduce an iron loss after the stress-relief annealing.

In addition, because the motor core is a conductor, an eddy current flows in a form in which a winding is short-circuited when an alternating current flows. This eddy current ultimately changes into heat and results in an eddy current loss. It is therefore preferable to reduce the eddy current as much as possible. In order to decrease this eddy current, laminates are preferably insulated from each other after the punching processing. Methods for the insulation include, for example, a method of oxidizing a cut/punched end surface by bluing processing after the stress-relief annealing (see the PATENT DOCUMENT 2, for example). The bluing processing is processing of forming an oxide film of ferrous oxide (II) (FeO), triiron tetraoxide ($Fe_3O_4$), or the like on the surface of a steel sheet by raising a dew point within a furnace after stress-relief annealing. This bluing processing can perform insulation processing on the surface of the steel sheet, and improve a corrosion resisting property and a rust preventive property of the cut/punched end surface.

PATENT DOCUMENTS

[Patent Document 1]
PCT Patent Publication No. WO2018/179871
[Patent Document 2]
Japanese Patent Laid-Open No. 2015-42015
[Patent Document 3]
Japanese Patent Laid-Open No. 2017-166721

SUMMARY

Technical Problems

The motor core manufacturing method of the above-described PATENT DOCUMENT 1 performs cooling at a cooling rate of 10° C./minute or less, more preferably 5° C./minute or less. Although this is unsatisfying for a worker or the like in terms of a processing time in the stress-relief annealing, the processing time in the stress-relief annealing is further lengthened by performing the bluing processing in a case where the bluing processing is to be further performed in addition. In addition, in the case where the bluing processing is to be performed, equipment for the bluing processing needs to be provided. This brings an additional problem in terms of cost, for example.

It is an object of the present disclosure to provide a heat treatment method and a heat treatment furnace that enable characteristics on an equal level to those when bluing processing is performed to be obtained, without the bluing processing being performed, in stress-relief annealing of a motor core.

Solution to Problems

In order to achieve the above object, according to a first aspect of the present disclosure, there is provided a heat treatment method in stress-relief annealing of a motor core, the heat treatment method including
an annealing step of annealing the motor core by using an exothermic converted gas as a furnace atmospheric gas, and
a cooling step of cooling the motor core obtained in the annealing step, by using an exothermic converted gas as a furnace atmospheric gas, in a temperature range from a temperature in the annealing step to 500° C. at a cooling rate exceeding 600° C. per hour.

Preferably, the cooling step is performed immediately after the annealing step.

Preferably, the cooling step includes cooling the motor core after undergoing the annealing step to 300° C.

Preferably, the cooling rate is a rate in a range equal to or higher than 650° C. per hour to equal to or lower than 700° C. per hour.

Preferably, an oxygen partial pressure within a system in the cooling step is equal to or higher than the lower one of an oxygen balanced partial pressure of $3/2Fe+O_2=1/2Fe_3O_4$ and an oxygen balanced partial pressure of $2Fe+O_2=2FeO$, and equal to or lower than an oxygen balanced partial pressure of $4/3Fe+O_2=2/3Fe_2O_3$.

Preferably, a degreasing/preheating step of degreasing and/or preheating the motor core before the annealing step is included.

In addition, according to a second aspect of the present disclosure, there is provided a heat treatment furnace including a heating chamber configured to be supplied with an exothermic converted gas as a furnace atmospheric gas, and to anneal a motor core, and a cooling chamber configured to be supplied with an exothermic converted gas as a furnace atmospheric gas, and to cool the motor core passed through the heating chamber, in a temperature range from a temperature during annealing to 500° C. at a cooling rate exceeding 600° C. per hour.

Preferably, the cooling chamber is disposed on a downstream side of the heating chamber so as to communicate directly with the heating chamber.

Preferably, the cooling rate is a rate in a range equal to or higher than 650° C. per hour and equal to or lower than 700° C. per hour.

A degreasing/preheating chamber may be further provided upstream of the heating chamber.

Preferably, the cooling chamber is configured such that an oxygen partial pressure within a system in the cooling chamber is equal to or higher than the lower one of an oxygen balanced partial pressure of $3/2Fe+O_2=1/2Fe_3O_4$ and an oxygen balanced partial pressure of $2Fe+O_2=2FeO$, and equal to or lower than an oxygen balanced partial pressure of $4/3Fe+O_2=2/3Fe_2O_3$.

Advantageous Effect of Invention

According to the foregoing first and second aspects of the present disclosure, it is possible to provide a heat treatment method and a heat treatment furnace that enable characteristics on an equal level to those when bluing processing is performed to be obtained, without the bluing processing being performed, in stress-relief annealing of a motor core.

DESCRIPTION OF EMBODIMENT

A heat treatment furnace and a heat treatment method in the heat treatment furnace according to one embodiment of the present disclosure will hereinafter be described with reference to the drawings.

Figure 1:
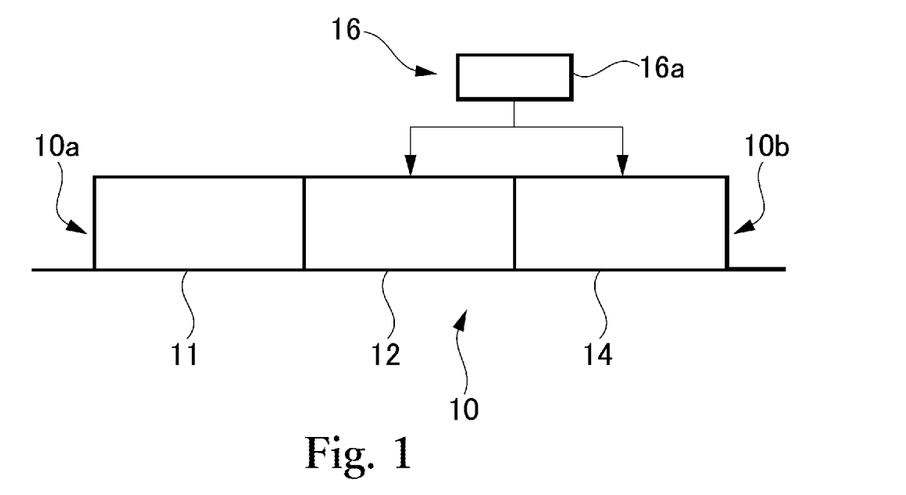
FIG. 1 is a schematic diagram illustrating a configuration of a heat treatment furnace according to one embodiment of the present disclosure.

FIG. 1 illustrates a heat treatment furnace 10 according to one embodiment of the present disclosure. The heat treatment furnace 10 includes a degreasing/preheating chamber 11, a heating chamber 12, and a cooling chamber 14. The heating chamber 12 is provided on the downstream side of the degreasing/preheating chamber 11. The cooling chamber 14 is provided on the downstream side of the heating chamber 12. The heating chamber 12 directly communicates with the degreasing/preheating chamber 11. The cooling chamber 14 directly communicates with the heating chamber 12. No partition door is provided between the degreasing/preheating chamber 11 and the heating chamber 12. However, the partition door may be provided between the degreasing/preheating chamber 11 and the heating chamber 12. Similarly, no partition door is provided between the heating chamber 12 and the cooling chamber 14, either. However, the partition door may be provided between the heating chamber 12 and the cooling chamber 14. The degreasing/preheating chamber 11 and the heating chamber 12 each include a heater. Each heater is controlled such that the temperature of the chamber in which the heater is installed becomes a corresponding target temperature. The cooling chamber 14 includes cooling means, for example, a water cooling system. Incidentally, the degreasing/preheating chamber 11 can function and may be used not only as a degreasing chamber and a preheating chamber but only as a degreasing chamber or only as a preheating chamber.

The heat treatment furnace 10 includes an atmospheric gas supply device (hereinafter, a gas supply device) 16. The gas supply device 16 is configured to supply an exothermic converted gas. The gas supply device 16, in this case, includes a conversion furnace 16a that is supplied with a fuel gas and air and that generates a converted gas. The gas supply device 16 further includes a gas supply control device that controls supply of the gas generated in the conversion furnace 16a to the inside of the heat treatment furnace. A mixing ratio between the air and the fuel gas supplied to the conversion furnace 16a is controlled to a predetermined ratio. A hydrocarbon gas such as methane ($CH_4$), propane ($C_3H_8$), or butane ($C_4H_{10}$) is preferably used as the fuel gas.

The converted gas generated in the conversion furnace 16a is cooled and/or dehydrated, and is then supplied, as an atmospheric gas, to the inside of the heat treatment furnace 10. In this case, as illustrated in FIG. 1, such a gas is supplied to each of the inside of the heating chamber 12 and the inside of the cooling chamber 14. Incidentally, the degreasing/preheating chamber 11 communicates with the heating chamber 12. The gas supply device 16 may be connected only to the heating chamber 12 or only to the cooling chamber 14, and the gas may flow into the next chamber. Incidentally, a combustion device as the conversion furnace 16a of the gas supply device 16 may be provided so as to be included in the heating chamber 12, for example (see the PATENT DOCUMENT 3, for example). This can improve the heating efficiency of the heating chamber 12.

The heat treatment furnace 10 is provided with various sensors. An oxygen sensor that can measure an oxygen partial pressure is preferably provided. However, various other sensors such as a temperature sensor for measuring a temperature can also be provided. For example, there may be provided a hydrogen sensor for measuring a hydrogen partial pressure, a dew point sensor for measuring a dew point within the heat treatment furnace 10, a CO sensor capable of measuring a carbon monoxide partial pressure, a $CO_2$ sensor capable of measuring a carbon dioxide partial pressure, and the like.

In this heat treatment furnace 10, a heat treatment object is transported so as to enter an entrance 10a, pass through the degreasing/preheating chamber 11, the heating chamber 12, and the cooling chamber 14 in order, and exit from an exit 10b. For this transportation, the heat treatment furnace 10 includes a transporting device including a mesh belt or a hearth roller. In the heat treatment furnace 10, the cooling chamber 14 is directly connected downstream of the heating chamber 12 without a slow cooling chamber. Hence, the heat treatment object that has exited the heating chamber 12 is immediately cooled in the cooling chamber 14. Incidentally, in a conventionally existing heat treatment furnace that anneals an ordinary motor core, a slow cooling chamber is provided for slow cooling of the heat treatment object on the downstream side of a heating chamber and the upstream side of a cooling chamber.

In the heat treatment furnace 10, the exit 10b is provided at a downstream end of the cooling chamber 14. That is, the cooling chamber 14 is connected to the exit 10b of the heat treatment furnace 10 without a bluing processing chamber. The heat treatment furnace according to one embodiment of the present disclosure not only performs stress-relief annealing but also makes it possible to obtain, without performing bluing processing, characteristics on an equal level to those when the bluing processing is performed. However, the heat treatment furnace according to one embodiment of the present disclosure does not exclude the inclusion of a bluing processing chamber. That is, a bluing processing chamber may be provided on the downstream side of the cooling chamber 14. The bluing processing is processing of producing an oxide film on the surface of a steel sheet by blowing a high dew point gas such as a water vapor during a fall in temperature of the annealing furnace. More specifically, the bluing processing refers to processing of producing an oxide film of ferrous oxide (II) (FeO), triiron tetraoxide ($Fe_3O_4$), or the like on the surface of the heat treatment object by introducing a high dew point gas in a processing chamber at 350° C. to 550° C. Incidentally, the bluing processing is performed with an objective of, for example, enhancing a corrosion resisting property and a rust preventive property of a punched end surface.

The heat treatment object will be described in the following. A starting raw material for the heat treatment object is an electrical steel sheet, and is a non-oriented electrical steel sheet used for an iron core (motor core) of a motor or the like in a more concrete example. The starting raw material can be a grain-oriented electrical steel sheet used for an iron core of a transformer or the like. The electrical steel sheet is a soft magnetic material, and is desired to have an excellent magnetic characteristic and, in particular, a low iron loss.

The non-oriented electrical steel sheet is generally manufactured by performing iron making, steelmaking, hot rolling, and cold rolling in succession, followed by primary recrystallization by continuous annealing and crystal grain growth processing. The manufactured non-oriented electrical steel sheet is subjected to predetermined punching processing, and a plurality of non-oriented electrical steel sheets are laminated within the die, for example, to form a laminated material. The electrical steel sheets are laminated by a method such as welding, bonding, and/or caulking. It is consequently possible to obtain a motor core with a low iron loss as the heat treatment object to be subjected to stress-relief annealing processing in the heat treatment furnace 10. However, the heat treatment object is not limited to that manufactured by this method. In addition, the motor core to be heat-treated as described later is not limited to the thus laminated motor core, but may be a non-laminated motor core.

It is to be noted that there is no particular limitation on the composition of the electrical steel sheet to be heat-treated in the heat treatment furnace according to the present disclosure and/or the electrical steel sheet used in the heat treatment method according to the present disclosure. For example, a steel sheet defined in JIS C 2552, a steel sheet defined in JIS C 2553, a steel sheet defined in JIS C 2555, and the like are preferable and usable. In addition, the sheet thickness of the electrical steel sheet to be used is not particularly limited.

Figure 2:
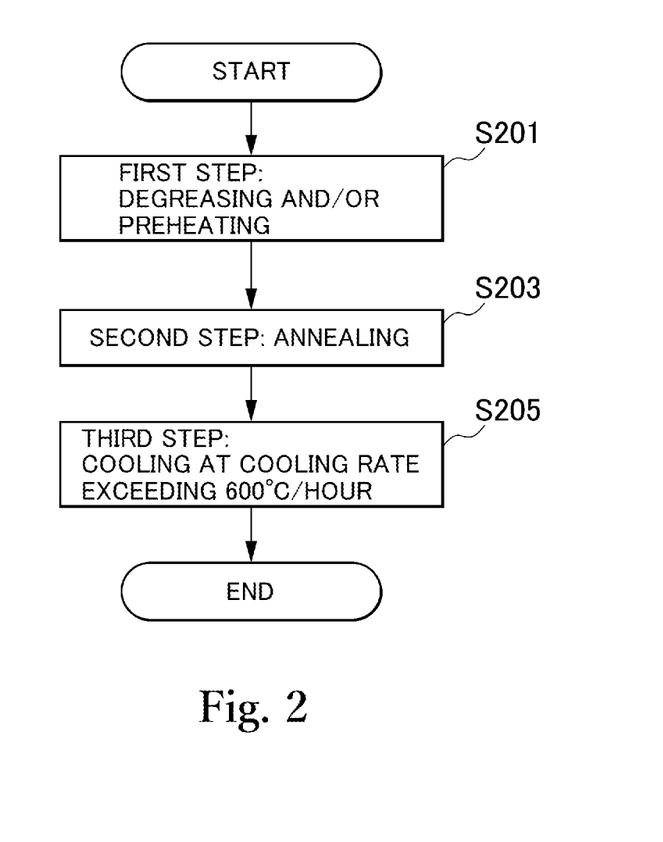
FIG. 2 is a flowchart of a heat treatment method in the heat treatment furnace of FIG. 1.

The heat treatment method for the above-described heat treatment object in the heat treatment furnace 10 will be described with reference to FIG. 2. FIG. 2 illustrates a flowchart of an example of the heat treatment method according to the present embodiment.

As illustrated in FIG. 2, the heat treatment method according to the present embodiment includes
- a first step (step S201) of degreasing and/or preheating a motor core as a heat treatment object,
- a second step (step S203) of annealing the motor core after undergoing the first step, by using an exothermic converted gas as a furnace atmospheric gas, and
- a third step (step S205) of cooling the motor core obtained in the second step, by using the exothermic converted gas as the furnace atmospheric gas, in a temperature range from a temperature in the second step to 500° C. at a cooling rate exceeding 600° C. per hour.

The first step (step S201) is a step of degreasing and/or preheating the above-described laminated motor core in the degreasing/preheating chamber 11. The first step will be referred to as a degreasing/preheating step in the following. The first step is performed with an objective of, for example, removing a press oil adhering to the motor core as the heat treatment object and the like. In this case, this first step is given because the heat treatment furnace 10 includes the degreasing/preheating chamber 11. However, this first step can be omitted in a case where the degreasing/preheating chamber 11 is not provided in the heat treatment furnace 10.

The second step (step S203) is a step of annealing (heat-treating) the above-described laminated motor core in the heating chamber 12. Shaping using punching processing, caulking, and the like causes a local strain of the iron core, which originates from a plastic strain and a residual stress. Accordingly, annealing processing is performed in this second step to remove the strain. In this second step, the motor core is heated for a predetermined time at a temperature in stress-relief annealing of the motor core, preferably a soaking temperature. As for annealing conditions, though not particularly limited, the motor core is generally retained for approximately 30 minutes to 2 hours at a temperature of approximately 750° C. to 850° C. Incidentally, in the following, because the motor core is cooled at a cooling rate exceeding 600° C. instead of slow cooling in the third step to be described next, heat treatment in the second step will be referred to as annealing or annealing processing, and the second step will be referred to as an annealing step.

The third step (step S205) is a step of cooling the motor core annealed in the above-described second step at a cooling rate exceeding 600° C. per hour in the cooling chamber 14. The third step will be referred to as a cooling step in the following. Because the cooling chamber 14 is provided on the downstream side of the heating chamber 12 so as to communicate directly with the heating chamber 12, this third step (cooling step) is performed immediately after the second step (annealing step).

The above-described cooling rate in the third step is desired to be a rate in a range exceeding 600° C. per hour and equal to or lower than 700° C. per hour (that is, 600° C./hour<cooling rate≤700° C./hour), and is preferably a rate in a range equal to or higher than 650° C. per hour and equal to or lower than 700° C. The cooling rate exceeding 600° C. per hour can make a time required for the processing shorter than conventional (see the PATENT DOCUMENT 1). In addition, to set a cooling rate exceeding 700° C. per hour needs additional installation of not only mere cooling means but also equipment for forced cooling (for example, a fan for forced cooling).

The cooling of the motor core at the cooling rate in the cooling chamber 14 in the third step is performed at least in a temperature range of a temperature in the second step (annealing step), preferably a soaking temperature (for example, 850° C.) to 500° C. However, the above-described cooling rate is an average cooling rate in such a temperature range. Incidentally, the cooling of the motor core at the cooling rate exceeding 600° C./hour may be performed in a temperature range of the temperature in the second step to 300° C.

It is to be noted that, while the heat treatment method according to the present embodiment is a method that makes it possible to obtain, without performing the bluing processing, characteristics on an equal level to those when the bluing processing is performed, while performing stress-relief annealing, as described above, the heat treatment method according to the present embodiment does not exclude the application of the bluing processing. That is, the bluing processing may be performed after the third step. When the bluing processing is not performed after the third step, the cooling of the motor core at the cooling rate exceeding 600° C./hour is preferably performed in the temperature range from the temperature in the second step to 300° C. It is to be noted that these do not exclude the cooling of the motor core at the cooling rate in a temperature range from the temperature in the second step to 300° C. lower than 500° C. when the bluing processing is performed after the third step.

In annealing in the second step and rapid cooling in the third step, an exothermic converted gas is used as a furnace atmospheric gas. A DX gas, for example, can be cited as the exothermic converted gas. The DX gas has a cooling property better than that of a $N_2$ gas or an Ar gas, and can therefore be suitably used as the furnace atmospheric gas at a time of the rapid cooling in the third step. Incidentally, as described above, in this case, an exothermic converted gas, for example, the DX gas can be similarly used also in the first step.

However, at the time of the cooling in the cooling chamber 14 in the third step, the oxygen partial pressure of a cooling atmosphere in a system in the cooling chamber 14 is preferably set to be
equal to or higher than the lower one of an oxygen balanced partial pressure of $3/2Fe+O_2=1/2Fe_3O_4$ and an oxygen balanced partial pressure of $2Fe+O_2=2FeO$ and equal to or lower than an oxygen balanced partial pressure of $4/3Fe+O_2=2/3Fe_2O_3$. This is to suitably control oxidation of the motor core, and will be understandable from an Ellingham diagram representing a standard free energy of formation of an iron oxide. Operation of the conversion furnace 16a of the gas supply device 16, a mixing ratio between the air and the fuel gas supplied to the conversion furnace 16a, and/or the cooling and/or dehydration of the converted gas generated in the conversion furnace 16a and the like are preferably controlled so as to realize this atmosphere.

Examples

As samples of examples, stress-relief annealing processing was performed by subjecting a plurality of motor cores prepared as described above to degreasing/preheating (first step) and annealing (second step) under a predetermined condition and subsequent rapid cooling (third step: a cooling rate exceeding 600° C. per hour). Incidentally, a heat treatment temperature in the second step was set at 750° C. to 850° C., and the cooling rate in the third step was set to be a cooling rate exceeding 600° C. per hour in a temperature range from the heat treatment temperature to 500° C. In addition, the DX gas as an exothermic converted gas was used as an atmospheric gas in the second step and the third step. Motor cores according to examples 1 and 2 for which slow cooling was not performed after annealing and for which the bluing processing was not performed were thus obtained.

As samples of reference examples for comparison, motor cores according to reference examples 1 to 4 were obtained by performing cooling after annealing with the cooling rate set at approximately 300° C. to approximately 400° C. Also in the reference examples, the DX gas was used as an atmospheric gas in the second step and the third step. The motor cores according to the reference examples were also cooled at a cooling rate of approximately 300° C. to approximately 400° C. without slow cooling after the annealing. However, the bluing processing was not performed for the motor core at the reference example 1, while the bluing processing was performed for each of the motor cores according to the other reference examples 2, 3 and 4 after the cooling of each of the motor cores. Incidentally, a bluing processing condition was retention for approximately 30 minutes in the DX gas at a temperature of 450° C. to 550° C. and around a dew point of +40° C.

(Evaluation)

As for evaluation, the treated motor cores were first evaluated for an iron loss, lamination thickness, and an amount of change in inside diameter.

First, as for the iron loss, a winding was provided to the electrical steel sheet already processed by stress-relief annealing, that is, the motor core, and the iron loss was measured by a method compliant with JIS (C 2550) (Epstein test). Then, an iron loss value of one motor core obtained in the example 1 was set at 1 (base value), and the values of ratios of the iron loss values of the separately obtained motor cores to the iron loss value of this motor core were obtained. As for the lamination thickness, an amount of change in lamination thickness of the motor core for which the above-described base value was set before and after annealing processing was set at 1 (base value), and the values of ratios of amounts of change in lamination thickness of the separately obtained motor cores to the amount of change in this motor core were obtained. As for the amount of change in inside diameter, an amount of change in inside diameter of the motor core for which the above-described base value was set before and after the annealing processing was set at 1 (base value), and the values of ratios of amounts of change in inside diameter of the separately obtained motor cores to the amount of change in this motor core were obtained.

Table 1 indicates an example of the values of the ratios of the iron losses, the lamination thicknesses, and the amounts of change in inside diameter of the samples according to the present examples and the reference examples. Incidentally, Table 1 also indicates cooling rates in the third step or a step corresponding to the third step and the presence or absence of the bluing processing.

TABLE 1

|  | Example 1 | Example 2 | Reference example 1 | Reference example 2 | Reference example 3 | Reference example 4 |
|---|---|---|---|---|---|---|
| Cooling rate (° C./h) | 681.3 | 691.2 | 358.7 | 294.4 | 330.7 | 320.2 |
| Bluing processing | Absent | Absent | Absent | Present | Present | Present |
| Value of ratio of iron loss | 1 (base value) | 0.98 | 0.97 | 0.97 | 1.02 | 1.01 |
| Value of ratio of lamination thickness | 1 (base value) | 1.07 | 2.21 | 2.41 | 2.35 | 3.24 |
| Value of ratio of amount of change in inside diameter | 1 (base value) | 2.50 | 4.00 | 4.50 | 4.50 | 5.50 |

As indicated in Table 1, it has been found that the iron loss values of the motor cores according to the examples 1 and 2 in which the bluing processing is not performed and in which slow cooling is not performed either are on an equal level to those of the motor cores according to the reference example 1 in which cooling is performed at a cooling rate indicated in Table 1 and the reference examples 2, 3 and 4 in which the bluing processing is performed and in which cooling is performed at cooling rates indicated in Table 1.

In addition, as for the lamination thickness and the amount of change in inside diameter, as indicated in Table 1, it has been found that the motor cores according to the examples 1 and 2 in which the bluing processing is not performed and in which slow cooling is not performed either have values better than those of the motor cores according to the reference example 1 in which cooling is performed at a cooling rate indicated in Table 1 and the reference examples 2, 3 and 4 in which the bluing processing is performed and in which cooling is performed at cooling rates indicated in Table 1. This is considered to be because cooling times for the motor cores according to the present examples are shortened due to rapid cooling (at cooling rates exceeding 600° C. per hour), so that the oxidation of the motor cores during the cooling is suppressed, and the motor cores according to the present examples are not subjected to the bluing processing (that is, oxidation processing), so that the oxidation of the motor cores is further suppressed.

Incidentally, samples of motor cores according to examples obtained under conditions similar to those of the examples 1 and 2, except for performing cooling to 300° C. or lower without the bluing processing in the third step, could also provide excellent results similar to those of the examples 1 and 2 with regard to the iron loss, the lamination thickness, and the amount of change in inside diameter.

Next, in order to determine the corrosion resisting properties of the obtained motor cores, a neutral salt water spray test was performed on the motor core according to the example 1 and a motor core for which the bluing processing was performed according to a reference example. Test conditions included 35° C. 85% RH and 48 hours. As an evaluation, texture observation was performed on the motor cores before and after the corrosion resisting property test by using a scanning electron microscope. In addition, as a comparison target experiment, a similar texture observation was performed on a motor core for which annealing processing was not performed.

Figure 3:
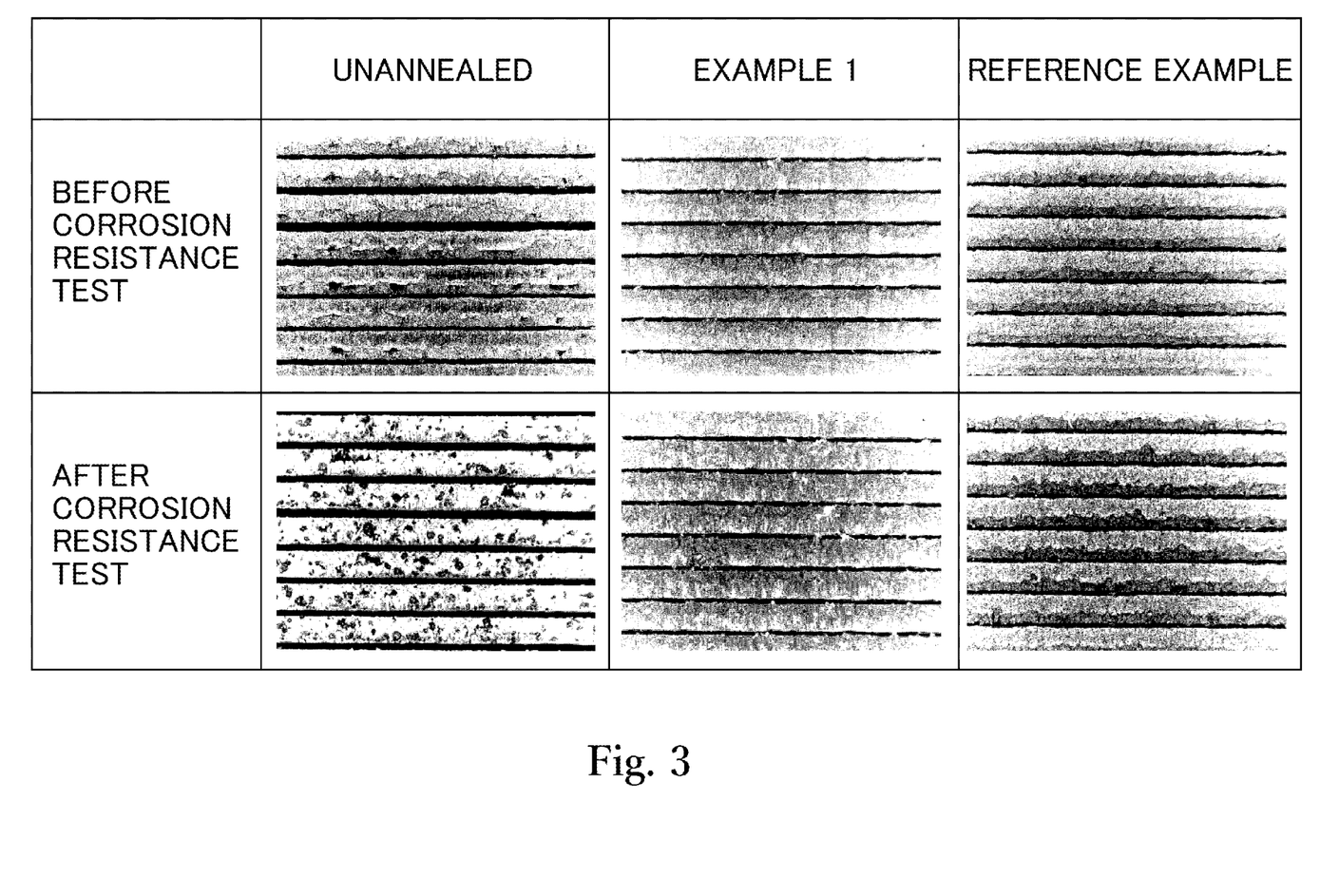
FIG. 3 is an example of texture photographs of motor cores.
Figure 4:
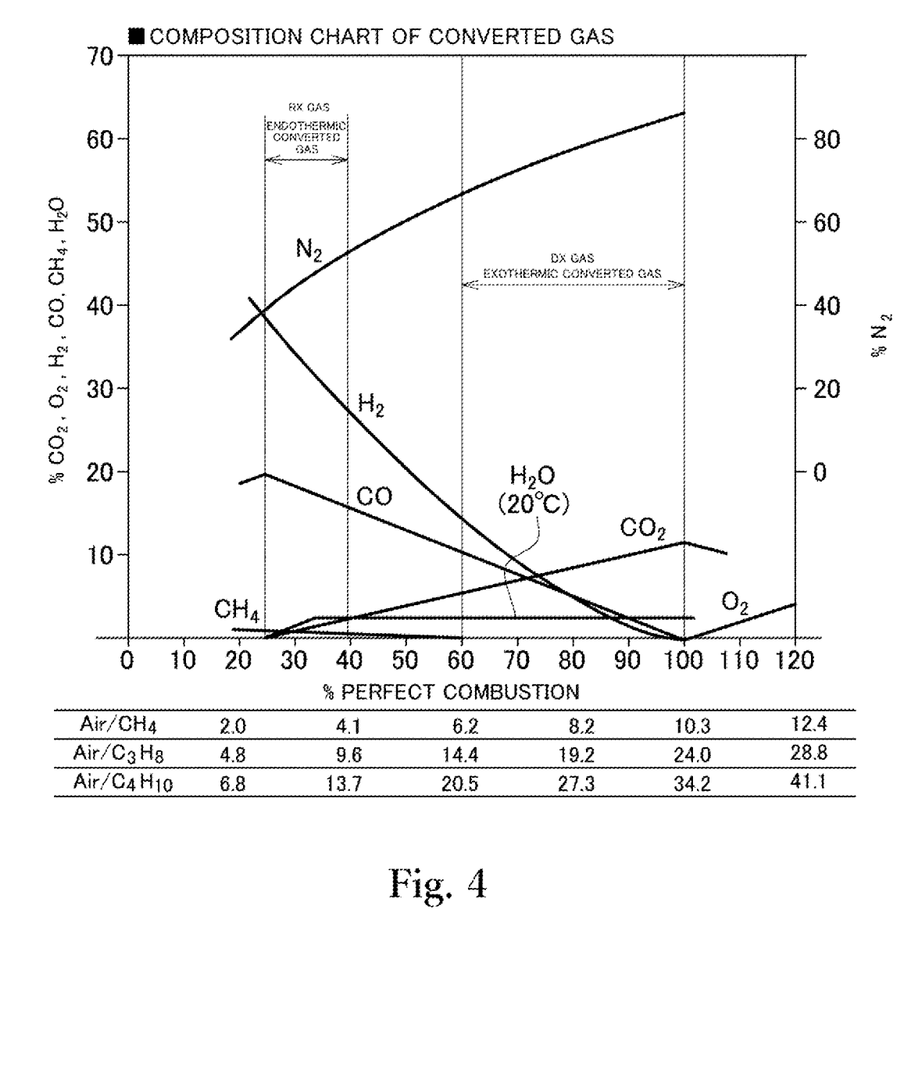
FIG. 4 is a graph illustrating relation between a mixing ratio between air and a fuel gas and a component ratio of a converted gas generated when the fuel gas is burned.

FIG. 3 illustrates an example of texture photographs of the motor cores. As illustrated in FIG. 3, it has been found that the motor core according to the example 1 does not exhibit a change in texture before or after the corrosion resisting property test even in comparison with the motor core according to the reference example, and thus has a sufficient corrosion resisting property. The inventors consider reasons for being able to obtain the motor core having a sufficient corrosion resisting property in the heat treatment method according to the present embodiment as follows. The DX gas, which is an exothermic converted gas, is used for the furnace atmosphere in the second step and the third step. Here, FIG. 4 illustrates relation between the mixing ratio between the air and the fuel gas supplied to the conversion furnace 16a of the gas supply device 16, that is, an air-fuel ratio, and the component ratio of the converted gas generated when the fuel gas is burned. As illustrated in FIG. 4, the DX gas includes water ($H_2O$). The water originating from the DX gas is considered to be able to produce an effect similar to that when the bluing processing is performed on the motor core in the second step and the third step.

The above results indicate that, on the basis of Table 1 and FIG. 3, according to the heat treatment furnace 10 and the heat treatment method in accordance with the present embodiment, a motor core having physical properties and a corrosion resisting property on an equal level to or better than those in a case where the bluing processing is performed and cooling is performed at a cooling rate indicated in Table 1 can be obtained even without the bluing processing being performed and without slow cooling being performed either. In addition, in the heat treatment furnace 10 and the heat treatment method according to the present embodiment, the bluing processing is not performed, nor is slow cooling performed, so that the processing time of the whole process can be reduced greatly as compared with conventional annealing processing.

A typical embodiment and the like of the present disclosure has been described above. However, the present disclosure is not limited to these, but can be modified in various manners. Various substitutions and changes can be made unless they depart from the spirit and scope of the present disclosure defined by claims of the present application.

The invention claimed is:
1. A heat treatment furnace comprising:
a heating chamber configured to be supplied with an exothermic converted gas as a furnace atmospheric gas and to anneal a motor core, the heating chamber comprising a heater configured to control a temperature of the heating chamber to become a target temperature in annealing; and a cooling chamber on a downstream side of the heating chamber communicating directly with the heating chamber, the cooling chamber being configured to be supplied with an exothermic converted gas as a furnace atmospheric gas, wherein the cooling chamber comprises cooling means configured to cool the motor core passed through the heating chamber, in a temperature range from the temperature in annealing to 500° C. at a cooling rate which is a rate in a range equal to or higher than 650° C. per hour and equal to or lower than 700° C. per hour.

2. The heat treatment furnace according to claim 1, further comprising:

a degreasing/preheating chamber upstream of the heating chamber.

3. The heat treatment furnace according to claim 1, wherein the cooling chamber is configured such that an oxygen partial pressure within a system in the cooling chamber is equal to or higher than a lower one of an oxygen balanced partial pressure of $3/2Fe+O_2=1/2Fe_3O_4$ and an oxygen balanced partial pressure of $2Fe+O_2=2FeO$, and equal to or lower than an oxygen balanced partial pressure of $4/3Fe+O_2=2/3Fe_2O_3$.

4. The heat treatment furnace according to claim 1, wherein the cooling means includes a water cooling system.

* * * * *